US011981447B2

United States Patent
Allen

(10) Patent No.: US 11,981,447 B2
(45) Date of Patent: May 14, 2024

(54) SYSTEMS FOR HARVESTING ROTATIONAL WHEEL ENERGY FOR LANDING GEAR RETRACTION

(71) Applicant: GOODRICH CORPORATION, Charlotte, NC (US)

(72) Inventor: Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 476 days.

(21) Appl. No.: 16/738,736

(22) Filed: Jan. 9, 2020

(65) Prior Publication Data

US 2021/0214096 A1    Jul. 15, 2021

(51) Int. Cl.
| | | |
|---|---|---|
| B64D 41/00 | (2006.01) | |
| B64C 25/50 | (2006.01) | |
| F03B 5/00  | (2006.01) | |
| F03B 11/00 | (2006.01) | |
| F03B 15/02 | (2006.01) | |

(52) U.S. Cl.
CPC .............. *B64D 41/00* (2013.01); *B64C 25/50* (2013.01); *F03B 5/00* (2013.01); *F03B 11/004* (2013.01); *F03B 15/02* (2013.01)

(58) Field of Classification Search
CPC ......... B64C 25/18; B64C 25/22; B64C 25/24; B64C 25/405; B64D 41/00; B60L 1/10; B60L 1/003; B60L 7/10; B60L 2200/10
See application file for complete search history.

(56) References Cited

U.S. PATENT DOCUMENTS

| | | | | |
|---|---|---|---|---|
| 2,138,030 | A * | 11/1938 | Giovannoli | ............. B64C 25/22 244/103 S |
| 3,850,389 | A * | 11/1974 | Dixon | ..................... B64C 25/40 244/103 S |
| 6,966,614 | B2 * | 11/2005 | Hamzeh | ..................... B60T 8/00 303/6.01 |
| 8,123,163 | B2 | 2/2012 | McCoskey et al. | |
| 8,396,613 | B2 | 3/2013 | Lynas et al. | |
| 9,821,905 | B2 | 11/2017 | Didey | |
| 10,073,811 | B2 | 9/2018 | Swearingen et al. | |
| 2005/0194495 | A1 * | 9/2005 | Seung | ................... B60T 8/1703 244/111 |

(Continued)

FOREIGN PATENT DOCUMENTS

| | | |
|---|---|---|
| CN | 106314765 | 1/2017 |
| EP | 2070818 | 6/2009 |

OTHER PUBLICATIONS

European Patent Office, European Search Report dated Jun. 7, 2021 in Application No. 21150904.7.

(Continued)

*Primary Examiner* — Michael H Wang
*Assistant Examiner* — Colin Zohoori
(74) *Attorney, Agent, or Firm* — SNELL & WILMER L.L.P.

(57) ABSTRACT

A system for extracting energy for landing gear retraction may comprise a wheel pump rotationally coupled to a wheel via a pinion gear. A landing gear control valve assembly may be fluidly coupled to an output of the wheel pump. A secondary pump may be fluidly coupled to the landing gear control valve assembly, and an electric motor may be operationally coupled to the secondary pump.

5 Claims, 4 Drawing Sheets

(56) References Cited

U.S. PATENT DOCUMENTS

| | | | | |
|---|---|---|---|---|
| 2009/0076668 A1* | 3/2009 | Lynas | .................... | B64C 25/405 |
| | | | | 701/3 |
| 2009/0121077 A1* | 5/2009 | Lynas | ..................... | B64C 25/30 |
| | | | | 244/58 |
| 2009/0152394 A1* | 6/2009 | Frank | ...................... | B64C 25/22 |
| | | | | 244/58 |
| 2013/0026284 A1* | 1/2013 | Christensen | .......... | B64C 25/405 |
| | | | | 244/50 |
| 2017/0341738 A1* | 11/2017 | Grieser | ................... | B64C 25/22 |
| 2019/0291853 A1* | 9/2019 | Bolton | .................... | F16D 57/06 |

OTHER PUBLICATIONS

European Patent Office, European Office Action dated Nov. 9, 2022 in Application No. 21150904.7.

* cited by examiner

SYSTEMS FOR HARVESTING ROTATIONAL WHEEL ENERGY FOR LANDING GEAR RETRACTION

FIELD

The present disclosure relates to landing gear, and more particularly, to systems for harvesting rotational wheel energy for landing gear retraction.

BACKGROUND

Aircrafts generally include landing gear that supports the aircraft during taxi, take-off, and landing. After take-off, the landing gear may be translated to a "landing gear up" position, wherein the landing gear translates into a wheel well defined by, for example, a wing or a fuselage of the aircraft. Electrical landing gear retraction systems tend to add weight, as compared to hydraulic systems, due to the weight of electric motor driven pumps. Further, electrically operated landing gear consumes a large amount of power provided by the aircraft systems, thereby preventing or discouraging more electric architectures, due to the lack of available power.

SUMMARY

A system for extracting energy from a rotating wheel for landing gear retraction is disclosed herein. In accordance with various embodiments, the system may comprise a first reservoir, a first wheel pump fluidly coupled to the first reservoir, a first pinion gear operationally coupled to the first wheel pump, a first landing gear control valve assembly fluidly coupled to the first wheel pump, a first secondary pump fluidly coupled to an input of the first landing gear control valve assembly, and a first electric motor operationally coupled to the first secondary pump.

In various embodiments, a bypass valve may be fluidly coupled between an output of the first wheel pump and an input of the first wheel pump. In various embodiments, a check valve may be coupled between the output of the first wheel pump and the input of the first landing gear control valve assembly.

In various embodiments, at least one of a first bay door actuator or a first landing gear extension-retraction actuator may be fluidly coupled to an output of the first landing gear control valve assembly.

In various embodiments, the system may further comprise a second reservoir, a second wheel pump fluidly coupled to the second reservoir, a second pinion gear operationally coupled to the second wheel pump, a second landing gear control valve assembly fluidly coupled to the second wheel pump, a second secondary pump fluidly coupled to an input of the second landing gear control valve assembly, and a second electric motor operationally coupled to the second secondary pump.

In various embodiments, at least one of a second bay door actuator or a second landing gear extension-retraction actuator may be fluidly coupled to an output of the second landing gear control valve assembly. In various embodiments, at least one of a third bay door actuator or a third landing gear extension-retraction actuator may be fluidly coupled to the output of the first landing gear control valve assembly.

A landing gear assembly is also disclosed herein. In accordance with various embodiments, the landing gear assembly may comprise a first wheel, a first wheel pump rotationally coupled to the first wheel, a landing gear control valve assembly fluidly coupled to a first output of the first wheel pump, a secondary pump fluidly coupled to an input of the landing gear control valve assembly, and an electric motor operationally coupled to the secondary pump.

In various embodiments, the landing gear assembly may further comprise a second wheel, and a second wheel pump rotationally coupled to the second wheel and fluidly coupled to the landing gear control valve assembly.

In various embodiments, a bypass valve may be fluidly coupled between the first output of the first wheel pump and a first input of the first wheel pump. The bypass valve may be fluidly coupled between a second output of the second wheel pump and a second input of the second wheel pump.

In various embodiments, a check valve may be coupled between the first output of the first wheel pump and the input of the landing gear control valve assembly.

In various embodiments, at least one of a bay door actuator or a landing gear extension-retraction actuator may be fluidly coupled to an output of landing gear control valve.

In various embodiments, the first wheel may define a plurality of teeth.

A system for extracting energy for landing gear retraction is also disclosed herein. In accordance with various embodiments, the system may comprise a first landing gear assembly including a first wheel, a first actuator configured to control retraction of the first landing gear assembly, and a first wheel pump rotationally coupled to the first wheel. The first wheel pump may comprise at least one of a first hydraulic pump or a first wheel powered electric motor. The at least one of the first hydraulic pump or the first wheel powered electric motor may be configured to generate an output in response to rotation of the first wheel. The output of the at least one of the first hydraulic pump or the first wheel powered electric motor may be configured to actuate the first actuator. The system may further comprise a second landing gear assembly including a second wheel, a second actuator configured to control retraction of the second landing gear assembly, and a second wheel pump rotationally coupled to the second wheel. The second wheel pump may comprise at least one of a second hydraulic pump or a second wheel powered electric motor.

In various embodiments, the first wheel pump may include the first hydraulic pump, and the system may further comprise a first reservoir fluidly coupled to the first hydraulic pump, a first landing gear control valve assembly fluidly coupled to the first hydraulic pump and the first actuator, a first secondary pump fluidly coupled to an input of the first landing gear control valve assembly, and a first electric motor operationally coupled to the first secondary pump.

In various embodiments, the second wheel pump may include the second hydraulic pump, and the second hydraulic pump may be fluidly coupled to the first reservoir and the first landing gear control valve assembly. The first landing gear control valve assembly may be fluidly coupled to the second actuator.

In various embodiments, the system may further comprise a third landing gear assembly including a third wheel, a third actuator configured to control retraction of the third landing gear assembly, and a third wheel pump rotationally coupled to the third wheel. The third wheel pump may be fluidly coupled to the first reservoir and the first landing gear control valve assembly. The first landing gear control valve assembly may be fluidly coupled to the third actuator.

In various embodiments, the system may further comprise a third landing gear assembly including a third wheel, a third actuator configured to control retraction of the third landing gear assembly, a third wheel pump rotationally coupled to the third wheel, a second reservoir fluidly coupled to the third wheel pump, a second landing gear control valve assembly fluidly coupled to the third wheel pump and the third actuator, a second secondary pump fluidly coupled to an input of the second landing gear control valve assembly, and a second electric motor operationally coupled to the second secondary pump.

In various embodiments, the second wheel pump may include the second hydraulic pump, and the system may further comprise a second reservoir fluidly coupled to the second hydraulic pump, a second landing gear control valve assembly fluidly coupled to the second hydraulic pump and the second actuator, a second secondary pump fluidly coupled to an input of the second landing gear control valve assembly, and a second electric motor operationally coupled to the second secondary pump.

In various embodiments, the system may further comprise a third landing gear assembly including a third wheel, a third actuator configured to control retraction of the third landing gear assembly, a third wheel pump rotationally coupled to the third wheel, a third reservoir fluidly coupled to the third wheel pump, a third landing gear control valve assembly fluidly coupled to the third wheel pump and the third actuator, a third secondary pump fluidly coupled to an input of the third landing gear control valve assembly, and a third electric motor operationally coupled to the third secondary pump.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
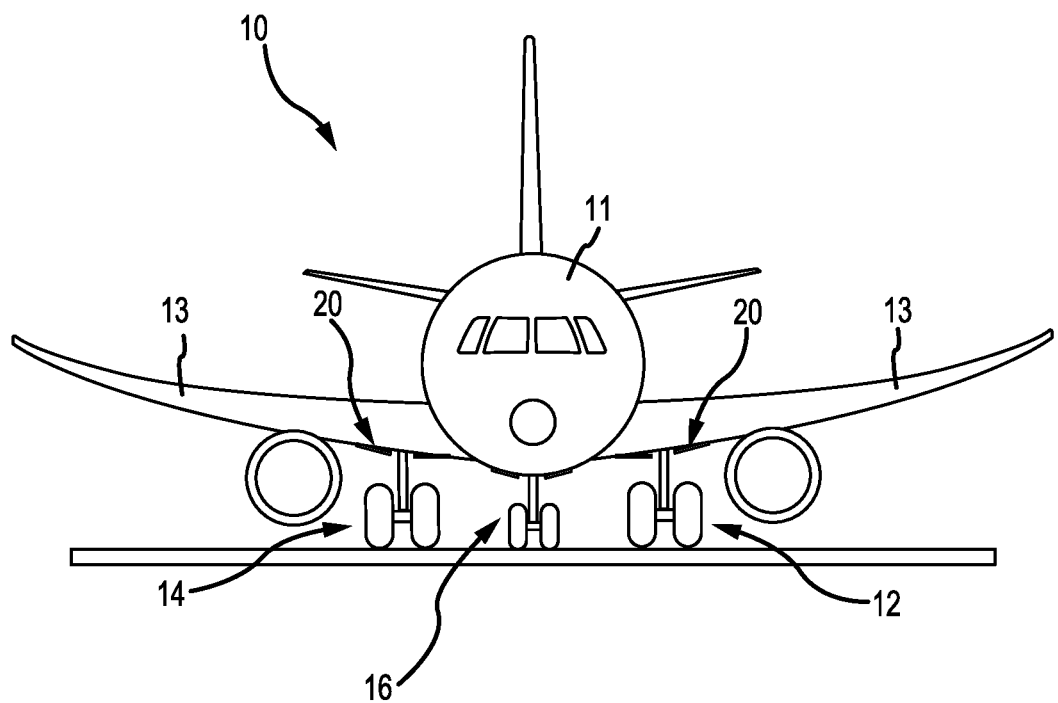
FIG. 1 illustrates an aircraft with landing gear in a landing gear down position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Surface shading and/or cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity.

With reference to FIG. 1, an aircraft 10 is illustrated, in accordance with various embodiments. Aircraft 10 may include a fuselage 11 and wings 13. Aircraft 10 may further include landing gear such as landing gear assembly 12, landing gear assembly 14, and landing gear assembly 16. In various embodiments, landing gear assembly 16 may be a nose landing gear assembly. Landing gear assembly 12, landing gear assembly 14, and landing gear assembly 16 may generally support aircraft 10, when aircraft is not flying, allowing aircraft 10 to taxi, take off, and land without damage.

Landing gear assemblies 12, 14, 16 may each include various shock strut assemblies with one or more wheels attached thereto. Landing gear assemblies 12, 14, 16 may each be configured to translate between a landing gear down position, wherein the landing gear extend from wings 13 and/or from fuselage 11 to support aircraft 10, and a landing gear up position, wherein the landing gear are located within wings 13 and/or fuselage 11 of aircraft 10. For example, during taxiing, take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing.

Landing gear assemblies 12, 14, 16 may each include landing gear uplock assemblies and landing gear downlock assemblies. The landing gear uplock assemblies may be configured to maintain landing gear assemblies 12, 14, 16 in the landing gear up position. The landing gear downlock assemblies may be configured to maintain landing gear assemblies 12, 14, 16 in the landing gear down position. In accordance with various embodiments, aircraft 10 may include landing gear bay doors 20, which may be translated to an open position prior to landing gear retraction and to a closed position after landing gear retraction. Bay doors 20 are also translated to the open position prior to landing gear extension.

Disclosed herein is a system for extracting energy from the rotating wheels of landing gear assemblies 12, 14, 16 after liftoff for landing gear retraction. In accordance with various embodiments, one or more of the landing gear wheel(s) is operationally coupled to a hydraulic pump. The system is configured such that rotation of the wheel drives the hydraulic pump and a flow of hydraulic fluid to the landing gear retraction system. The system may further include a secondary pump driven by an electrical motor. The secondary pump may be configured to power landing gear extension and the final stages of retraction. The power associated with extension and the final stages of retraction tends to be less than the power used during the initial retraction. In this regard, the power extraction system disclosed herein tends to reduce overall weight, as a small motor may be employed due to the decreased power requirement.

Figure 2:
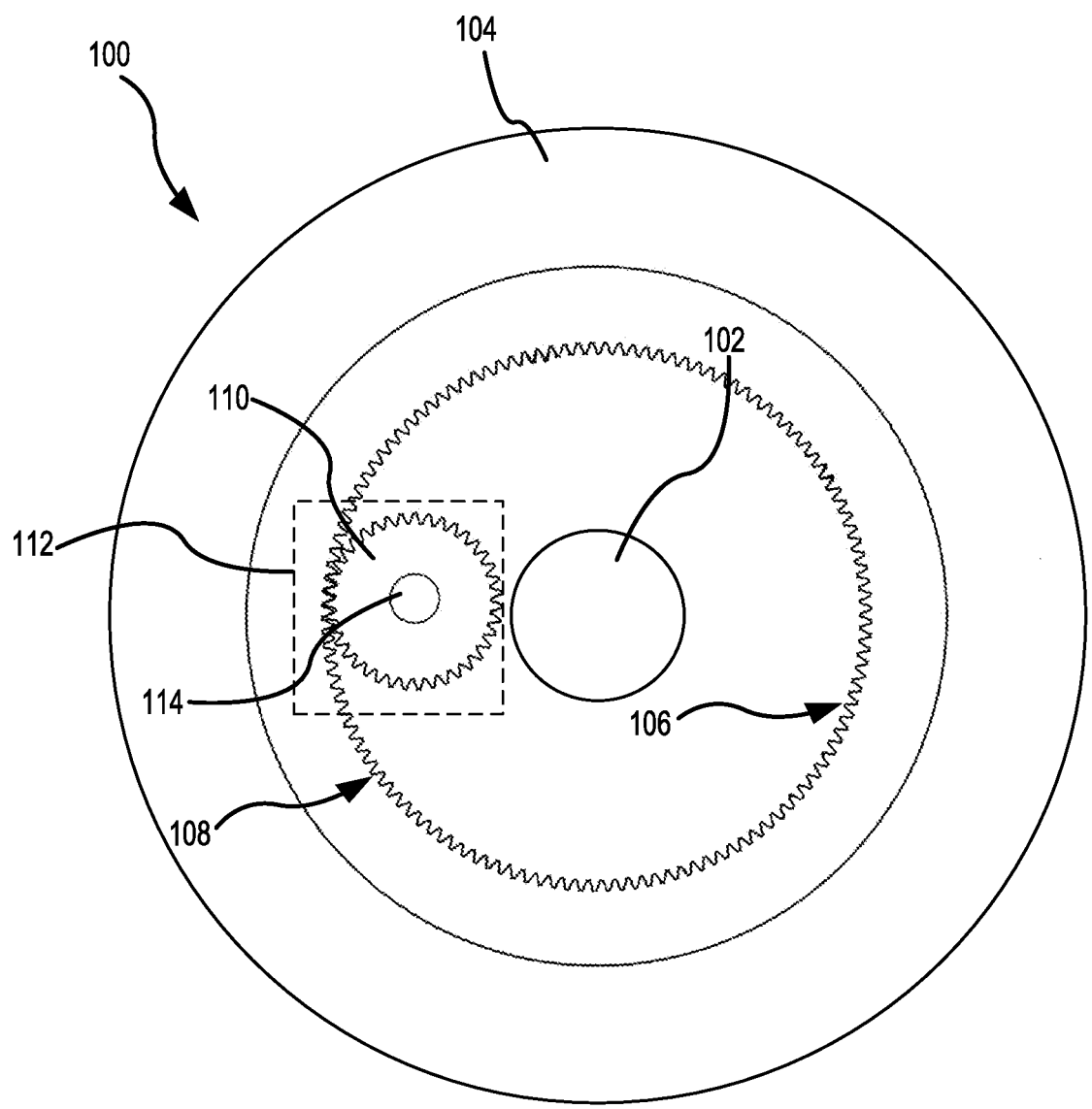
FIG. 2 illustrates a landing gear wheel assembly, in accordance with various embodiments.

With additional reference to FIG. 2, a wheel 100 of landing gear assembly 12 is illustrated. While FIG. 2 illustrates a wheel of landing gear assembly 12, it is contemplated and understood that landing gear assembly 14 and/or landing gear assembly 16 may include wheels similar to wheel 100. Wheel 100 may be configured for rotation about an axle 102. Wheel 100 may support a tire 104. An inner circumferential surface 106 of wheel 100 (i.e., a surface opposite tire 104) defines a plurality of teeth 108. Teeth 108 are configured to engage and/or are intermeshed with a pinion gear 110. Pinion gear 110 is operationally coupled to a wheel pump 112. For example, rotation of pinion gear 110 may drive wheel pump 112. In various embodiments, wheel pump 112 may be a hydraulic pump. In various embodiments, a strut 114 may rotationally couple pinion gear 110 and wheel pump 112. In various embodiments, a gear ratio of pinion gear 110 to wheel 100 may be greater than 5:1, greater than 10:1, or greater than 15:1. In various embodiments, gear ratio of pinion gear 110 to wheel 100 may be between 10:1 and 15:1. Wheel pump 112 may be mounted to a brake assembly or any other desired structure of landing gear assemblies 12, 14, or 16.

Figure 3:
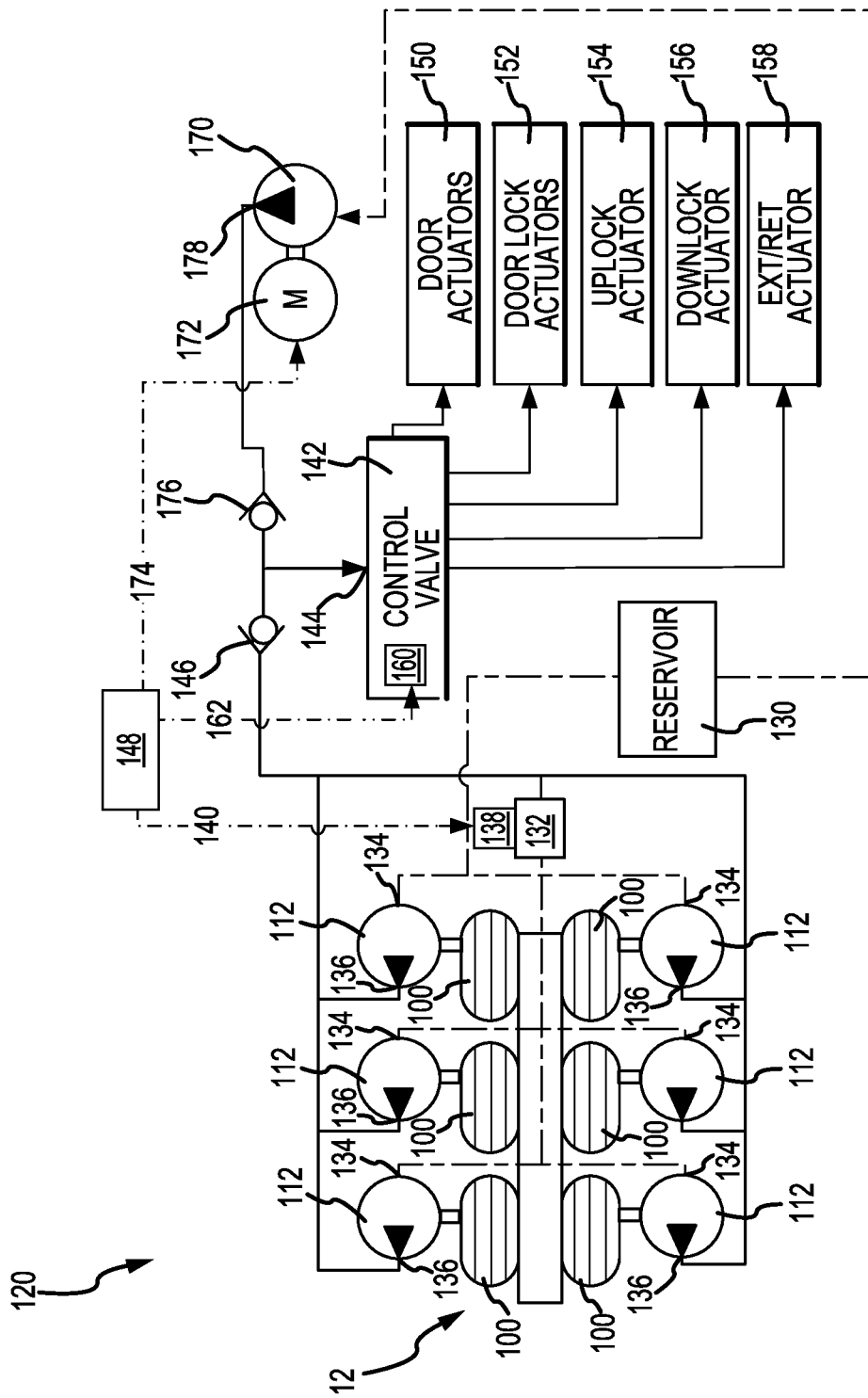
FIG. 3 illustrates a system for harvesting rotational wheel energy for landing gear retraction, in accordance with various embodiment.

With reference to FIG. 3, a schematic of a system 120 for extracting energy, for landing gear retraction, from the rotating wheels of a landing gear assembly is illustrated. System 120 includes one or more wheel pumps 112. Each wheel pump 112 is operationally coupled to a wheel 100. Wheel pumps 112 are rotationally coupled to wheels 100 such that torque is transferred between each wheel 100 and its respective wheel pump 112. Wheel pumps 112 are fluidly coupled to a reservoir 130. In accordance with various embodiments, rotation of wheels 100 may cause wheel pumps 112 to draw fluid from reservoir 130. In this regard, reservoir 130 is fluidly connected to a low pressure side (or input) 134 of each wheel pump 112. While landing gear assembly 12 is illustrated as having six wheels 100, it is contemplated and understood that system 120 may be employed by landing gear assemblies having more than six wheels (e.g., landing gear having eight wheels, ten wheels, etc.) and/or by landing gear assemblies having fewer than six wheels (e.g., landing gear having four wheels, two wheels, etc.).

In accordance with various embodiments, system 120 includes a bypass valve 132. Bypass valve 132 is fluidly coupled between inputs 134 of wheel pumps 112 and a high pressure side (or output) 136 of each wheel pump 112. Bypass valve 132 is configured to translate between an open state and a closed state. In the open state, bypass valve 132 allows the fluid output from wheel pumps 112 to be routed back to the input 134 of each wheel pump 112 (i.e., recirculates the fluid). In accordance with various embodiments, bypass valve 132 is configured to be in the open state during taxi. In this regard, system 120 is configured to circulate the flow of hydraulic fluid between the inputs 134 and outputs 136 of wheel pumps 112 at a low pressure while the aircraft is taxiing. In various embodiments, system 120 may include a bypass valve integrated with each wheel pump 112 rather than, or in addition to, a centralized, single bypass valve 132.

In accordance with various embodiments, bypass valve 132 is configured to translate to the closed state in response initiation of landing gear retraction. For example, in various embodiments, bypass valve 132 is configured to translate to the closed state in response to a start initial retraction signal 140. The start initial retraction signal 140 may be sent from a controller 148. Controller 148 may be located in a cockpit of aircraft 10, with momentary reference to FIG. 1. In various embodiments, the start initial retraction signal 140 may be an electrical signal sent via wired or wireless connection. In various embodiments, signal 140 may be a mechanical signal. For example, signal 140 may be sent via a mechanical sequence. In various embodiments, controller 148 may send a start initial retraction signal 140 in response to an action performed by a pilot or other aircraft crew member (e.g., in response to actuation of a switch, button, lever, etc.). The start initial retraction signal 140 may be sent to a bypass actuator 138 operationally coupled to bypass valve 132. Bypass actuator 138 is configured to translate bypass valve 132 between the open state and the closed state. In response to receiving the start initial retraction signal 140, bypass actuator 138 may translate bypass valve 132 to the closed state.

The output 136 of each wheel pump 112 is fluidly coupled to an input 144 of a landing gear control valve assembly 142. In accordance with various embodiments, when bypass valve 132 is in the closed state, the hydraulic fluid output from wheel pumps 112 is provided to the landing gear control valve assembly 142. In this regard, in response to start initial retraction signal 140, bypass valve 132 is translated to the closed state and hydraulic fluid from reservoir 130 is provided, via wheel pumps 112, which are being driven by rotation of wheels 100, to landing gear control valve assembly 142 to power landing gear retraction.

In various embodiments, a valve 146 may be located between outputs 136 of wheel pumps 112 and input 144 of landing gear control valve assembly 142. Valve 146 may be a check valve (i.e., a one-way valve), a shuttle valve, or any other valve configured to reduce or prevent backflow (i.e., flow of fluid from input 144 towards outputs 136).

In various embodiments, landing gear control valve assembly 142 is operationally coupled to one or more landing gear assembly actuators, such as, for example, one or more bay door actuators 150, one or more door uplock actuators 152, one or more landing gear uplock actuators 154, one or more landing gear downlock actuators 156, and one or more extension-retraction actuators 158. In accordance with various embodiments, landing gear control valve assembly 142 is configured to control the actuation of each of bay door actuators 150, door uplock actuators 152, landing gear uplock actuators 154, landing gear downlock actuators 156, and extension-retraction actuators 158.

Bay door actuators 150 may be configured to actuate the landing gear bay doors 20, with momentary reference to FIG. 1, through which landing gear assembly 12 translates. Bay door actuators 150 may be configured to translate landing gear bay doors 20 between a door open position and a door closed position. Door uplock actuators 152 may be configured to actuate door lock assembly operationally coupled to landing gear bay doors 20. Door uplock actuators 152 may be configured to translate the door lock assembly between a locked position, wherein the bay doors are prevented from opening, and an unlocked position, wherein the bay doors may translate to the open position. Landing gear uplock actuators 154 may be configured to actuate a landing gear uplock assembly of landing gear assembly 12. Landing gear uplock actuators 154 may translate the landing gear uplock assembly between a locked position, wherein the landing gear is locked in the up position (i.e., prevented from translating to the landing gear down position), and an unlocked position, wherein the landing gear is free to translate to the landing gear down position. Landing gear downlock actuators 156 may be configured to actuate a landing gear downlock assembly of landing gear assembly 12. Landing gear downlock actuators 156 may translate the landing gear downlock assembly between a locked position, wherein the landing gear is locked in the down position (i.e., prevented from translating to the landing gear up position), and an unlocked position, wherein the landing gear is free to translate to the landing gear up position. Extension-retraction actuators 158 may be configured to actuate landing gear assembly 12 between the landing gear down position and the landing gear up position.

In various embodiments, landing gear control valve assembly 142 is fluidly coupled to bay door actuators 150, door uplock actuators 152, landing gear uplock actuators 154, landing gear downlock actuators 156, and extension-retraction actuators 158. In this regard, fluid output from landing gear control valve assembly 142 may control actuation of bay door actuators 150, door uplock actuators 152, landing gear uplock actuators 154, landing gear downlock actuators 156, and/or extension-retraction actuators 158. Stated differently, bay door actuators 150, door uplock actuators 152, landing gear uplock actuators 154, landing gear downlock actuators 156, and/or extension-retraction actuators 158 may actuate in response to receiving fluid from landing gear control valve assembly 142. In various embodiments, landing gear control valve assembly 142 may include a plurality of valves and/or a manifold configured to control the flow of fluid to of each of bay door actuators 150, door uplock actuators 152, landing gear uplock actuators 154, landing gear downlock actuators 156, and extension-retraction actuators 158.

In accordance with various embodiments, the flow of fluid to each of bay door actuators 150, door uplock actuators 152, landing gear uplock actuators 154, landing gear downlock actuators 156, and extension-retraction actuators 158 may be controlled by one or more control valve actuators 160 of landing gear control valve assembly 142. Control valve actuators 160 may translate one or more valves (e.g., solenoid valves) of landing gear control valve assembly 142 between the open position and closed position to control the flow of fluid to bay door actuators 150, door uplock actuators 152, landing gear uplock actuators 154, landing gear downlock actuators 156, and extension-retraction actuators 158.

Control valve actuators 160 may actuate the valves of landing gear control valve assembly 142 in response to one or more signals 162 (e.g., a plurality of independent signals) output by controller 148. For example, in response to receiving an open doors signal 162, control valve actuators 160 may actuate landing gear control valve assembly 142 to a position wherein fluid is provided to bay door actuators 150, thereby causing the landing gear bay doors to open. In response to receiving an unlock landing gear downlock signal 162, control valve actuators 160 may actuate landing gear control valve assembly 142 to a position wherein fluid is provided to landing gear downlock actuators 156, thereby causing the landing gear downlock assembly to translate to the unlocked position. In response to receiving a landing gear retract signal 162, control valve actuators 160 may actuate landing gear control valve assembly 142 to a position wherein fluid is provided to extension-retraction actuators 158, thereby causing landing gear assembly 12 to translate to the landing gear up position. In various embodiments, signals 162 may be a plurality of independent electrical signals sent via wired or wireless connection. In various embodiments, signals 162 may be mechanical. For example, signals 162 may be sent via a mechanical sequence initiated by, for example, a pilot or other crew member.

In accordance with various embodiments, system 120 is configured such that fluid is provided to landing gear control valve assembly 142 via wheel pumps 112 while wheels 100 are rotating. It may be desirable to stop rotation of wheels 100 prior to wheels 100 entering the landing gear bay. In this regard, rotation of wheels 100 may cease prior to landing gear assembly 12 being fully retracted (i.e., before the landing gear is in the landing gear up position). In this regard, system 120 may further include a secondary pump 170. Secondary pump 170 may provide fluid to landing gear control valve assembly 142, when wheels 100 are not rotating and/or when wheel pumps 112 are not providing sufficient fluid to landing gear control valve assembly 142. An electric motor 172 may be operationally coupled to secondary pump 170. Electric motor 172 may be configured to cause secondary pump 170 to pump fluid from reservoir 130 to input 144 of landing gear control valve assembly 142. While FIG. 3 shows reservoir 130 providing fluid to wheel pumps 112 and secondary pump 170, in various embodiments, secondary pump 170 may pump fluid from a second fluid reservoir, separate from reservoir 130 and dedicated to providing fluid to secondary pump 170.

Electric motor 172 may be operationally coupled to controller 148. Electric motor 172 may be configured to cause secondary pump 170 begin pumping in response to receiving signals 174 from controller 148. Controller 148 may be configured to send signal 174 in response to, for example, the flow of fluid from wheel pumps 112 decreasing below a predetermined threshold, a rotational speed (i.e., rotation per minute (RPM)) of wheels 100 decreasing below a predetermined RPM threshold, a brake pressure applied to wheels 100 exceeding a predetermined braking threshold, and/or to any other indicator that wheels 100 are not rotating and/or that wheels pumps are not outputting a sufficient flow of fluid to landing gear control valve assembly 142.

In various embodiments, a valve 176 may be located between the output 178 of secondary pump 170 and input 144 of landing gear control valve assembly 142. Valve 176 may be a check valve, a shuttle valve, or any other valve configured to reduce or prevent backflow (i.e., flow from input 144 toward output 178). In various embodiments, valve 146 and valve 176 may be part of a valve configured to allow fluid from valve 146 and valve 176 to flow simultaneously to input 144. In various embodiments, valve 146 and valve 176 may be part of a shuttle valve configured to allow fluid from either valve 146 or valve 176 to flow to input 144. For example, valve 146 and valve 176 may be configured such that when valve 146 is in the open state, valve 176 is in the closed state. For example, if the pressure of flow of fluid from wheel pumps 112 is greater than the pressure of the flow of fluid from secondary pump 170, valve 146 will be in the open state and valve 176 will be in the closed state. If the pressure of the fluid from secondary pump 170 is greater than the pressure of the fluid from wheel pumps 112, valve 146 will be in the close state and valve 176 will be in the open state.

In various embodiments, fluid from secondary pump 170 is provided to landing gear control valve assembly 142 for the final stages of landing gear retraction and/or to close the landing gear bay doors after the landing gear is located completely within the wheel bay and/or to actuate the landing gear uplock and/or the door uplock to the locked positions. In various embodiments, the landing gear uplock and/or the door uplock may actuate to the locked position automatically in response to translation of the landing gear to the up position. In various embodiments, fluid from secondary pump 170 is provided to landing gear control valve assembly 142 for landing gear extension prior to landing. For example, in response to receiving a landing gear down signal 174 from controller 148, electric motor 172 may cause secondary pump 170 to begin pumping fluid to landing gear control valve assembly 142. Landing gear control valve assembly 142 may output the fluid from secondary pump to bay door actuators 150, door uplock actuators 152, landing gear uplock actuators 154, and/or extension-retraction actuators 158, thereby causing the landing gear bay doors to unlock and open, the landing gear uplock assembly to translate to the unlocked state, and the landing gear to begin translating to the landing gear down position.

In various embodiments, system 120 may be configured to allow secondary pump 170, which is driven by electric motor 172, to spin-up (i.e. rotate) wheels 100 immediately following landing gear extension. For example, fluid output from secondary pump 170 may be provided to wheel pumps 112 via one or more valves configured to direct fluid from secondary pump 170 to wheel pumps 112. The fluid from secondary pump 170 may drive wheel pumps 112, which in turn drive rotation of pinion gears 110 (FIG. 2), thereby transferring torque to and causing rotation of wheels 100. Allowing secondary pump 170 to input energy into wheels 100, allows the energy from spinning wheels 100 to be used for retraction of the landing gear should landing be aborted (e.g., if a "go-around" procedure is initiated). Also, spun-up (i.e., rotating) wheels 100 tend to reduce spin-up and spring-back loads in the landing gear assemblies at touchdown.

Extracting energy from rotating wheels 100 for retraction of landing gear assembly 12 tends to allows system to employ a relatively small electric motor 172, as electric motor 172 is generally only used for landing gear extension and the final stages of retraction. A smaller motor tends to reduce an overall weight of the landing gear retraction system.

While FIG. 3 illustrates system 120 extracting energy from the wheels of landing gear assembly 12, it is contemplated and understood that landing gear assembly 14 and/or landing gear assembly 16 may each include a system for extracting energy from the wheels of landing gear assembly similar to system 120. For example, in various embodiments, landing gear 14 may include a system for extracting energy from the wheels of landing gear assembly that includes wheel pumps operationally coupled to the wheels of landing gear 14, and landing gear 16 may include a system for extracting energy from the wheels of landing gear assembly that include wheel pumps operationally coupled to the wheels of landing gear 16 (similar to wheel pumps 112 in FIG. 2 and FIG. 3). The system of landing gear 14 may also include its own reservoir, landing gear control valve assembly, secondary pump, electric motor, and check valves, similar, respectively, to reservoir 130, landing gear control valve assembly 142, secondary pump 170, electric motor 172, and check valves 146, 176 in FIG. 3. The system of landing gear 16 may also include its own reservoir, landing gear control valve assembly, secondary pump, electric motor, and check valves, similar, respectively, to reservoir 130, landing gear control valve assembly 142, secondary pump 170, electric motor 172, and check valves 146, 176 in FIG. 3.

Figure 4:
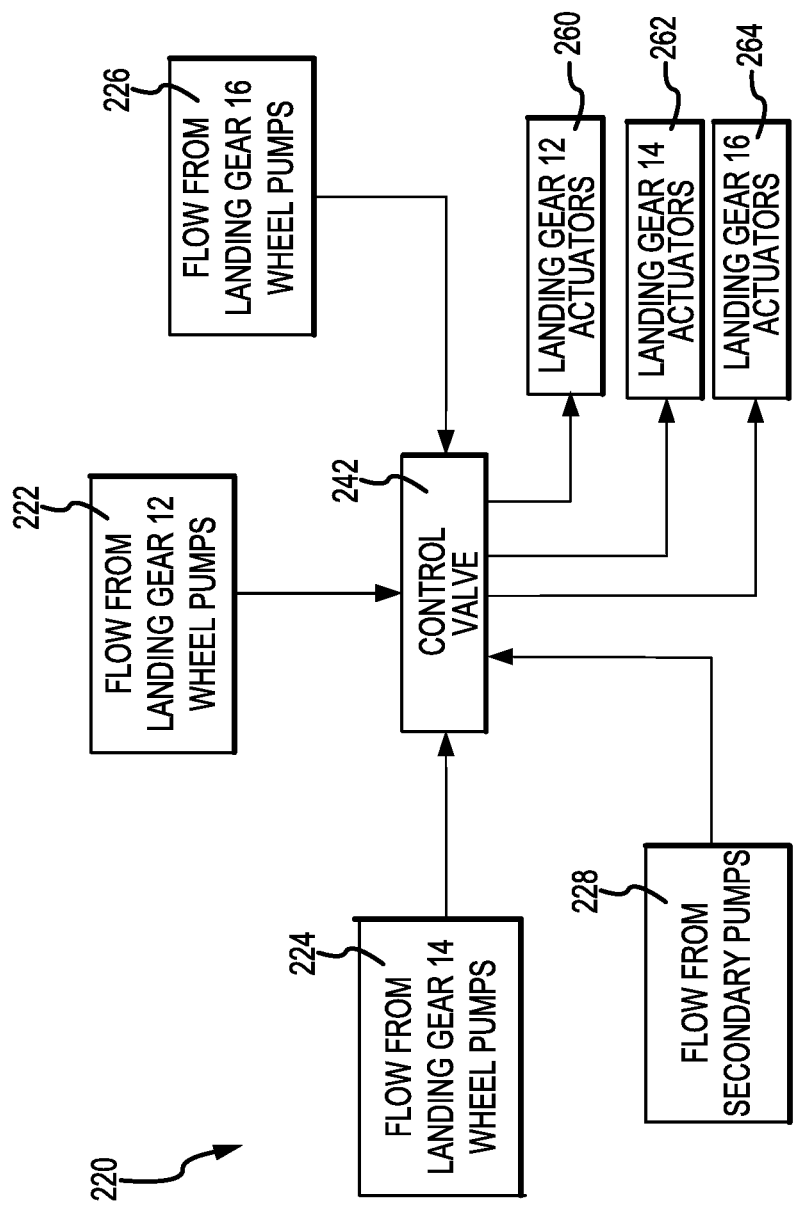
FIG. 4 illustrates a system harvesting rotational wheel energy for landing gear retraction.

With reference to FIG. 4, a schematic of a system 220 for extracting energy, for landing gear retraction, from the rotating wheels of a landing gear assembly is illustrated. In accordance with various embodiments, system 220 includes wheel pumps 222 operationally coupled to the wheels of landing gear assembly 12, wheel pumps 224 operationally coupled to the wheels of landing gear assembly 14, and wheel pumps 226 operationally coupled to the wheels of landing gear assembly 16. Wheel pumps 222, 224, 226 are rotationally coupled to the wheels of landing gear assemblies 12, 14, 16 such rotation of wheels drives the wheels pumps, similar to wheel pumps 112 in FIGS. 2 and 3.

The wheel pumps 222, 224, 226 of landing gear assemblies 12, 14, 16 are fluidly coupled to a landing gear control valve assembly 242 of system 220. Stated differently, system 220 is configured such that the wheel pumps 222, 224, 226 of landing gear assemblies 12, 14, 16 pump fluid from one or more reservoirs to landing gear control valve assembly 242. Landing gear control valve assembly 242 is configured to control retraction and extension of each of landing gear assemblies 12, 14, 16. Landing gear control valve assembly 242 may include a plurality of valves (e.g. solenoid valves) and/or a manifold configured to control a flow of fluid output to actuators of each landing gear assemblies 12, 14, 16. In accordance with various embodiments, system 220 may including one or more secondary pumps 228. Secondary pump(s) 228 may be driven by one or more electrical motors, similar to secondary pump 170 in FIG. 3. The secondary pump(s) 228 may be configured to provide fluid to landing gear control valve assembly 242. In various embodiments, system 220 may be configures such that secondary pump(s) 228 may be provide fluid to landing gear control valve assembly 242 for landing gear extension and the final stages of landing gear retraction (i.e., after the wheels have stopped spinning). In various embodiments, system 220 may be configured such that fluid output from secondary pumps 228 may be provided to wheel pumps 222, 224, 226 to drive rotation (e.g., spin-up) the wheels of landing gear assemblies 12, 14, 16 prior to touch-down.

In accordance with various embodiments, landing gear control valve assembly 242 is operationally (e.g., fluidly) coupled to actuators 260 of landing gear assembly 12, actuators 262 of landing gear assembly 14, and actuators 264 of landing gear assembly 16. In various embodiments, actuators 260 may include, for example, bay door actuators 150, door uplock actuators 152, landing gear uplock actuators 154, landing gear downlock actuators 156, and/or extension-retraction actuators 158, as shown in FIG. 3. In various embodiments, actuators 262 and actuators 264 may each include bay door actuators, door uplock actuators, landing gear uplock actuators, landing gear downlock actuators, and/or extension-retraction actuators, similar to bay door actuators 150, door uplock actuators 152, landing gear uplock actuators 154, landing gear downlock actuators 156, and/or extension-retraction actuators 158 of landing gear assembly 12.

In accordance with various embodiments, system 220 may be configured to provide redundancy should any of landing gear assembly 12, landing gear assembly 14, or landing gear assembly 16 fail to generate energy (e.g., pump fluid) for landing gear retraction. In this regard, the energy provided by one landing gear assembly's wheel pumps tends to be sufficient to power the retraction of multiple landing gear assemblies. Further, system 220 may increase consistency with regard to the positioning and timing of landing gear reaction, as one, central landing gear control valve assembly (i.e., landing gear control valve assembly 242) controls the actuation of each of the landing gear assemblies 12, 14, 16. Stated differently, one landing gear control valve assembly providing fluid simultaneously, or nearly simultaneously, to each of actuators 260, 262, 264, tends to increase a likelihood that all three landing gear legs will operate together and symmetrically In various embodiments, system 220 may be configured such that a single set of system components (e.g., reservoir, landing control valve assembly, secondary pump and electric motor, and check valves) serves all three landing gear assemblies 12, 14, 16. Stated differently, in various embodiments, system 220 may be configured such that one reservoir supplies fluid (i.e., is fluidly coupled) to wheel pumps 222, 224, 226, one landing control valve assembly receives fluid from the wheel pumps 222, 224, 226 and controls actuation of landing gear assemblies 12, 14, 16, one secondary pump is fluidly coupled to the landing control valve assembly and provides energy for extension of landing gear assemblies 12, 14, 16 and the final stages of retraction of landing gear assemblies 12, 14, 16, one electrical motor is configured to drive the secondary pump, one check valve is between the wheel pumps 222 and the landing gear control valve assembly, one check valve is between the wheel pumps 224 and the landing gear control valve assembly, one check valve is between the wheel pumps 226 and the landing gear control valve assembly, and one check valve is between the secondary pump and the landing gear control valve assembly.

In various embodiments, the main landing gear assemblies (i.e., landing gear assembly 12 and landing gear assembly 14) share one set of system components (e.g., reservoir, landing control valve assembly, secondary pump and electric motor, and check valves) and the nose landing gear assembly (i.e., landing gear assembly 16) has its own set of the same system components (i.e., reservoir, landing control valve assembly, secondary pump and electric motor, and check valves). Stated differently, system 220 may be configured such that a first reservoir supplies fluid (i.e., is fluidly coupled) to wheel pumps 222 and wheel pumps 224, a first landing control valve assembly receives fluid from the wheel pumps 222 and wheel pumps 224 and controls actuation of landing gear assemblies 12, 14, a first secondary pump is fluidly coupled to the first landing control valve assembly and provides energy for extension of landing gear assemblies 12, 14 and the final stages of retraction of landing gear assemblies 12, 14, a first electrical motor is configured to drive the first secondary pump, a first check valve is between the wheel pumps 222 and the first landing gear control valve assembly, a second check valve is between the wheel pumps 224 and the first landing gear control valve assembly, and a third check valve is between the first secondary pump and the first landing gear control valve assembly; and a second reservoir supplies fluid (i.e., is fluidly coupled) to wheel pumps 226, a second landing control valve assembly receives fluid from the wheel pumps 226 and controls actuation of landing gear assembly 16, a second secondary pump is fluidly coupled to the second landing control valve assembly and provides energy for extension of landing gear assembly 16 and the final stages of retraction of landing gear assembly 16, a second electrical motor is configured to drive the second secondary pump, a fourth check valve is between the wheel pumps 226 and the second landing gear control valve assembly, and a fifth check valve is between the second secondary pump and the second landing gear control valve assembly.

While system 120 in FIG. 3 and system 220 in FIG. 4 are described as powering and controlling landing gear retraction hydraulically, it is further contemplated and understood that system 120 and/or system 220 may be employed/modified to power and control landing gear retraction electrically. For example, in various embodiments, wheel pumps 112 may comprise electric motors configured to generate electrical current in response to rotation of wheels 100 (i.e., wheel powered electric motors). The current generated by the wheel powered electric motors may be employed to control translation of the landing gear retraction actuators (e.g., to control one or more of bay door actuators 150, door uplock actuators 152, landing gear uplock actuators 154, landing gear downlock actuators 156, and extension-retraction actuators 158).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for extracting energy from a rotating wheel for landing gear retraction, comprising:
    a first reservoir;
    a first plurality of teeth formed on an inner circumferential surface of the rotating wheel;
    a first wheel pump fluidly coupled to the first reservoir;
    a first pinion gear operationally coupled to the first wheel pump, wherein the pinion gear is configured to engage the first plurality of teeth, and wherein rotation of the first pinion gear drives the first wheel pump;
    a first landing gear control valve assembly;
    an input of the first landing gear control valve assembly fluidly coupled to an output of the first wheel pump and an input of a bypass valve, wherein an output of the bypass valve is fluidly coupled to an input of the first wheel pump, wherein the bypass valve is configured to translate between an open state and a closed state, wherein, in the open state, the bypass valve routes fluid output from the first wheel pump via the output of the first wheel pump to the input of the first wheel pump, wherein, in the closed state, the bypass valve routes the fluid output from the first wheel pump to the input of the first landing gear control valve assembly, wherein the first landing gear control valve assembly routes the fluid output from the first wheel pump, when the bypass valve is in the closed state, to one or more landing gear assembly actuators, wherein the one or more landing gear assembly actuators comprise one or more of bay door actuators, door uplock actuators, landing gear uplock actuators, landing gear downlock actuators, or extension-retraction actuators;
    a check valve located directly between the input of the first landing gear control valve assembly and the output of the first wheel pump, the check valve also being located directly between the input of the first landing gear control valve assembly and the input of a bypass valve, the check valve configured to prevent backflow of fluid from the input of the first landing gear control valve assembly to the output of the first wheel pump and the input of a bypass valve;
    a first secondary pump fluidly coupled to an input of the first landing gear control valve assembly; and
    a first electric motor operationally coupled to the first secondary pump.

2. The system of claim 1, further comprising at least one of a first bay door actuator or a first landing gear extension-retraction actuator fluidly coupled to an output of the first landing gear control valve assembly.

3. The system of claim 2, further comprising:
    a second reservoir;
    a second plurality of teeth formed on an inner circumferential surface of a second rotating wheel:
    a second wheel pump fluidly coupled to the second reservoir;
    a second pinion gear operationally coupled to the second wheel pump, wherein the second pinion gear is configured to engage the second plurality of teeth and wherein rotation of the second pinion gear drives the second wheel pump;
    a second landing gear control valve assembly fluidly coupled to the second wheel pump;
    a second secondary pump fluidly coupled to an input of the second landing gear control valve assembly; and
    a second electric motor operationally coupled to the second secondary pump.

4. The system of claim 3, further comprising at least one of a second bay door actuator or a second landing gear extension-retraction actuator fluidly coupled to an output of the second landing gear control valve assembly.

5. The system of claim 4, further comprising at least one of a third bay door actuator or a third landing gear extension-retraction actuator fluidly coupled to the output of the first landing gear control valve assembly.

* * * * *